June 2, 1931.  J. S. STEWART  1,808,690
AGRICULTURAL MACHINE
Filed Aug. 26, 1927   2 Sheets-Sheet 1
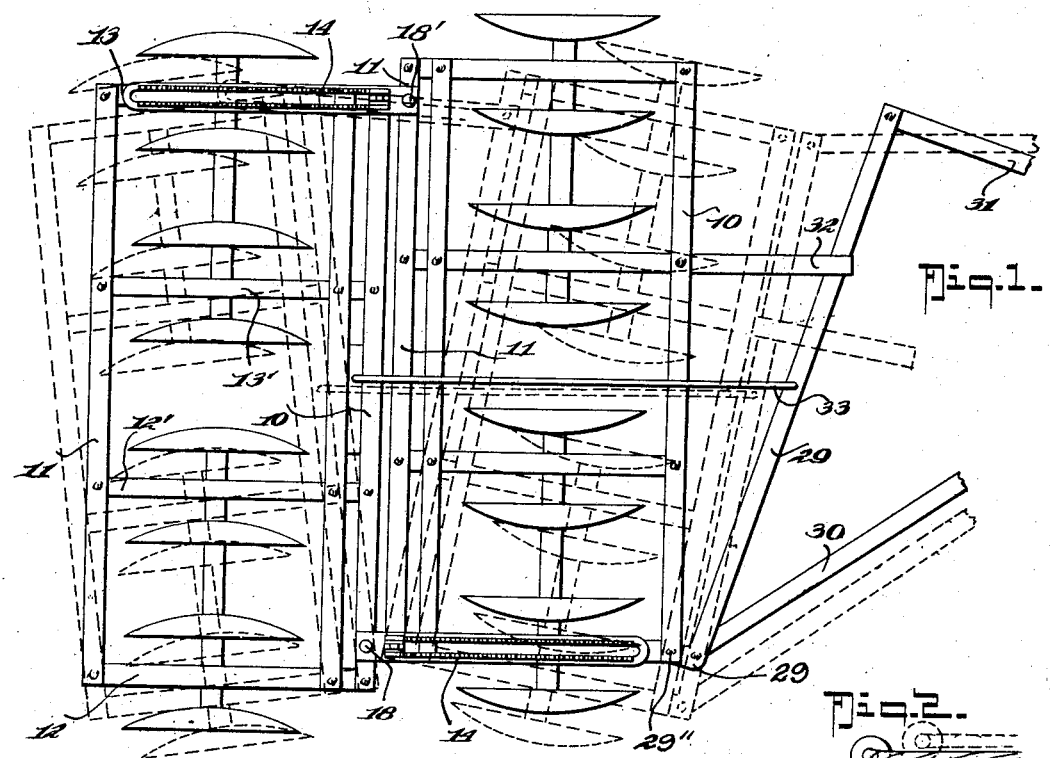
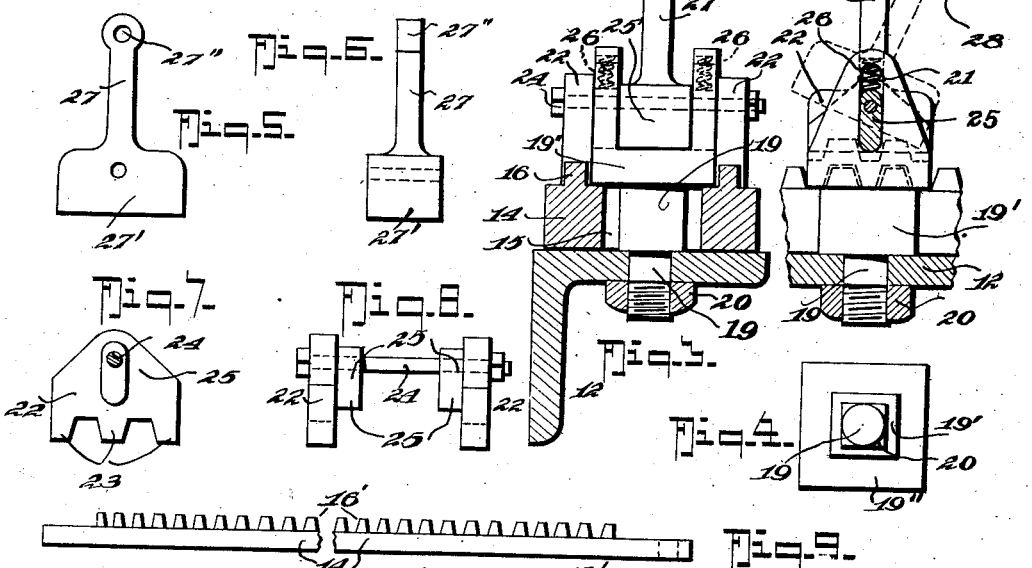
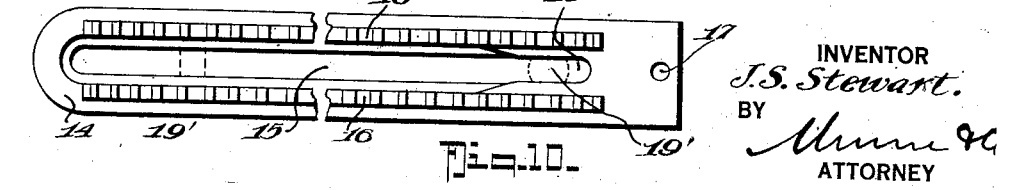
INVENTOR
J. S. Stewart.
BY
ATTORNEY June 2, 1931. J. S. STEWART 1,808,690
AGRICULTURAL MACHINE
Filed Aug. 26, 1927   2 Sheets-Sheet 2
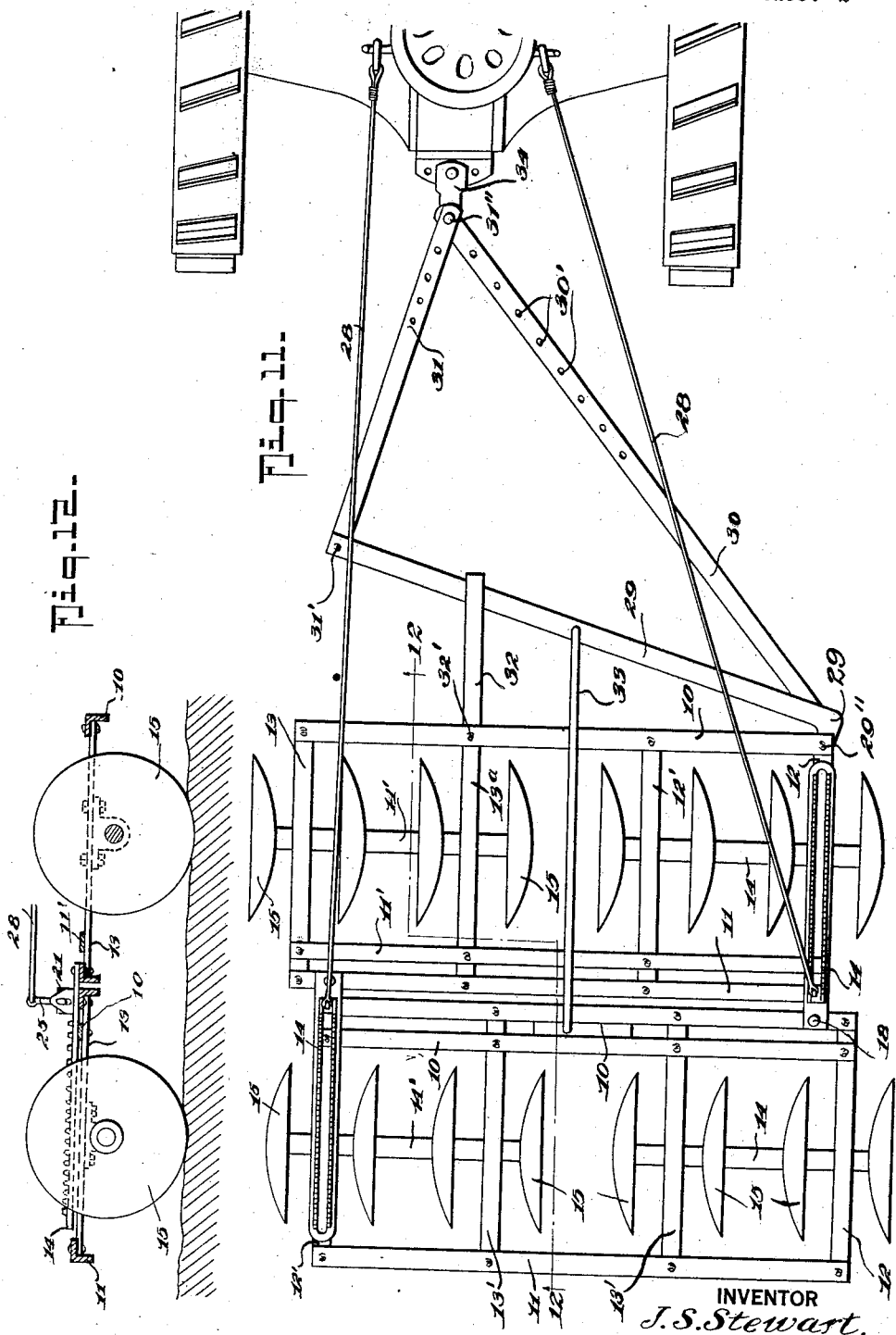
INVENTOR
J. S. Stewart.
BY
ATTORNEY Patented June 2, 1931

1,808,690

UNITED STATES PATENT OFFICE

JAMES S. STEWART, OF REDLANDS, CALIFORNIA, ASSIGNOR, BY MESNE ASSIGNMENTS, TO GEORGE VOSS, OF SAN BERNARDINO, CALIFORNIA

AGRICULTURAL MACHINE

Application filed August 26, 1927. Serial No. 215,700.

This invention relates to improvements in agricultural machines generally, and more particularly to disc gang harrow types of such machines.

Heretofore in the known prior practice of conditioning the soil in groves or orchards, the known type of disc harrows have functioned to throw the loosened soil in one direction only, either toward the trees or away from the same, making it necessary to employ two different types or makes of harrows when it is desired to throw the dirt or soil first in one direction and then in the opposite direction as aforesaid; and, again, these harrow constructions have provided for the off-setting of the hitch or draft of the same to one side only, and not to either sides thereof, or to the right and left, as is also desirable in the use of such devices or machines to facilitate the turning movements thereof, especially in the cultivation of groves or orchards.

Therefore, it is the principal object of the present invention to provide a harrow construction which will have tandem disk gangs so connected as to permit them to be placed in angular relation about either of two pivots respectively located at opposite ends of the gangs.

A further object of the invention is the provision of a draft or hitching means for disc harrows of the multiple gang type and wherein a pull on the same in one direction will effect an angular adjustment of the disc blades to throw the loosened soil in one direction, as, for instance, away from the trees being cultivated, or in the opposite direction, or toward the trees.

Another object of the invention is to provide adjustable connecting devices for coupling two disc gangs together, whereby by lengthening one or the other of the same, the gangs will be angularly offset one with respect to the other, and to either the right or left hand side of the machine as may be desired or necessary to vary or reverse the angular disposition of the disc blades to cause them to throw the loosened soil in a proper or desired direction.

With the foregoing and other equally important advantages and objects in view, the invention resides in the certain new and useful combination, construction and arrangement of parts as will be hereinafter more fully described, set forth in the appended claims, and illustrated in the accompanying drawings, in which:

Figure 1 is a top plan view of a preferred embodiment of the invention, and showing diagrammatically the several positions of adjustment and operation of the parts thereof, Figure 2 is an enlarged fragmentary detail, partly in section, of one of the adjustable devices for effecting the angular disposition of one of the disc gangs with respect to the other, Figure 3 is an enlarged transverse section through one of the side or end bars of a gang frame and the adjusting rack mounted on the same, and showing the trip device cooperative with the rack, the latter being in elevation, Figure 4 is a bottom plan view of one of the guide and latch supporting bolts per se, Figure 5 is a side elevation of the tilting trip lever for actuating the latch devices or dogs cooperative with the rack, Figure 6 is an end elevation of the said tilting trip lever, Figure 7 is an end elevation of one of the latch devices or dogs, Figure 8 is a side elevation thereof, Figure 9 is a side elevation of one of the adjusting racks, Figure 10 is a top plan view of the latter.

Figure 11 is a top plan view of the harrow attachment and the coupled end portion of the tractor and showing the disc gangs as they appear in their normally inoperative positions, and Figure 12 is a vertical longitudinal section taken on the line 2—2 of Figure 11.

Referring to the drawings, wherein similar characters of reference designate corresponding parts throughout the several views thereof, the embodiment of the invention as illustrated comprises two disc gangs, each comprising a substantially rectangular frame consisting of spaced parallel front and rear bars 10 and 11 connected together at their opposite ends by side or end bars 12 and 12' and intermediate bars 13 and 13' equidistantly spaced one from the other and from the side or end bars 12 and 13. Extending parallel to the rear bar 11, of the forward or leading gang frame, and to the front bar 10, of the rear or trailing gang frame, are intermediate bars 11' and 10' respectively, which are secured to the several cross bars 12, 12' and 13, 13' by means of fastenings similar to those used for securing the several bars of the gang frames together. These inner bars 10' and 11' are arranged in closely spaced relation to the adjacent ends of the frame bars 10 and 11, and act to brace the frames against angular distortion, as will be well understood.

The disc gang associated with each of the frames are preferably made into two sections consisting of aligned shafts 14 and 14' having disc harrow elements 15 mounted thereon in equidistantly spaced relation, the outer of the same being disposed at the opposite extremities of the shafts, substantially as shown. The shaft 14 is suitably supported from the under sides of the side or end bar 12 and the complemental intermediate bar 13, and the shaft 14' from the under side of the side or end bar 12' and the intermediate bar 13'.

The two gang frames are normally disposed in parallel and slightly offset relation one in advance of the other, substantially as is shown in full lines in Figure 1, and are coupled together for relative angular adjustment at their adjacent ends.

These adjustable and extensible connections or couplings each comprise an elongated plate or bar 14 having a slot 15 extending longitudinally of the same for a major portion of its length and upstanding sets of rack teeth 16 and 16' formed on its upper face in parallel relation to the longitudinal sides of the slot 15, and substantially co-extensive therewith. Pivot receiving apertures 17 are formed at one end of each of the rack plates or bars 14 and the ends of the slots 15, adjacent these apertures 17, are of a slightly reduced width, as at 15', for purposes which will be hereinafter fully explained.

In coupling the two gang frames together, the pivot aperture 17 of one of the rack plates or bars 14 will be engaged on a pivot pin 18 to the front bar 10 of the rearwardly disposed frame and at a point inwardly from one end thereof to have the rack plate or bar 14 disposed in overlapping and aligned relation with respect to the side or end bar 12 of the forward frame, while the other rack plate or bar 14 will have its pivot aperture 17 engaged over a pivot pin 18' upstanding from the rear bar 11 of the forward frame so as to extend rearwardly therefrom, and normally overlie the side or end bar 13 of the rearwardly disposed gang frame.

Carried by the rear bar 11 of the forward gang frame, and by the forward bar 10, of the rear gang frame, at the ends thereof opposite to the ends in which the pivot pins 18 and 18' are secured, and cooperative with the rack plates or bars 14, are latching devices, each comprising a bolt member formed to provide a lower end portion 19, a squared enlarged intermediate portion 19', and a still further enlarged and substantially U-shaped upper end portion 19''. The lower reduced portion 19 is projected downwardly through an aperture formed in the frame bar with which it is associated, and has its free end screw threaded to receive on the same a securing nut 20. The squared intermediate portion 19' is to be engaged in the slot 15 of the rack plate or bar 14 for the movement of the latter relative thereto correspondingly for the different movements of adjustments of the gang frames. By making the intermediate portion 19' of the U-bolts 19 of rectangular or square formation, the bolt is held against turning movements within the slotway 15, and the width of the reduced end portion 15' of the latter is just sufficient to admit of the portion 19' to engage in the same, when the frames are in parallel or non-working position. The enlarged upper U-shaped portion 19'' provides shoulders extending outwardly from the opposite vertical side faces of the intermediate portions 19', and these shoulders overlie and ride on the upper face of the rack plate or bar 14 to either side of the slot 15, and inwardly of the sets of rack teeth 16 and 16'. The opposite vertical portions of the upper U-shaped portion 19'' of the bolts are provided with vertically elongated slots 21 (Figure 2), the purpose of which will presently be explained.

Disposed at the outer sides of the vertical portions of the U-shaped portion 19'', of the bolt, are a pair of latch members or dogs 22 which have their lower edges formed to provide several teeth 23 corresponding to those of the rack plates or bars 16 and 16' with which they cooperate. A pivot member or rod 24 is extended across the vertical arms of the U-shaped portions 19'', of the bolt, and has its opposite ends projected outwardly through the slots 21 in the latter and through corresponding slots formed in the latch members or dogs 22. The opposite free ends of the pivot members or rods 24 are screw threaded to receive on the same the securing nuts 25 which are abutted against the outer faces of the latch members or dogs 22. Mounted on the pivot member or rod 24 immediately adjacent the inner sides of the latch members or dogs 22 are bearing members or blocks 25, which are supported for sliding engagement in the slots 21 and are pressed toward the lowermost ends of the latter by means of coiled springs 26.

Engaged on the pivot member or rod 24, between the vertical portions of the U-shaped portions 19″ of the bolt, is an actuating member or lever 27, which has its lower end portion thickened and elongated, as at 27′, in a direction parallel to the opposed faces of the U-shaped portion 19″ and its flat lower face normally disposed in close parallel relation to the horizontal portion or bottom of the latter. The upper end of the actuating member or lever 27 is apertured, as at 27″, to have attached thereto one end of an operating member or cable 28.

The two gang harrow as thus constructed and arranged, is to be coupled to a draft device, such as the tractor, as shown in Figure 11, and this is to be accomplished through the medium of an angular draft frame consisting of a bar 29, which is provided with an angularly bent end portion 29′ pivotally connected, as at 29″, to one of the forward corners of the front or leading gang frame, to which pivot 29″ is also connected one end of a second bar 30. The bar 30 extends at an acute angle to the bar 29, and both of these bars have their ends, opposite to the ends of the same which are engaged with the pivot 29″, pivotally connected to the opposite ends of a third bar 31, as at 31′ and 31″ respectively. By this angular association of the several bars 29, 30 and 31, the draft frame formed thereby has the general form of a triangle, substantially as shown. Projecting forwardly from the front side of the leading gang frame in line with the cross bar 13′ is a guide member 32, which is constructed to provide a long horizontal slot for the passage through the same of the draft bar or lever 29. Extending rearwardly from a medial point of connection with the draft bar or lever 29 is a bar or rod 33, which has its rear end secured to the forward part of the rear or trailing gang frame, whereby a pulling or pushing movement on the draft frame is transmitted directly through the bar or rod 33 to the same. Connected to the pivot pin or bolt 31″, at the forward ends of the draft bars 30 and 31, is a coupling member 34, which, in turn, is connected to the usual coupling of a tractor or the like, substantially as shown. With the harrow coupled to the tractor, the cables 28 lead forwardly to points convenient to the reach of the operator, when seated on the tractor.

In operation, a tractor or other draft means will be connected to the draft frame at the forward end of the harrow by the coupling member 34, and when the harrow is adjusted for transport the dogs 22 will be engaged with the rack members 15, one at the rear end of the rack member carried by the rear or trailing gang frame, and the other at the forward end of the rack member carried by the forward or leading gang frame, the front and rear gang frames are thus secured in close-up parallel relation, with the disc blades of both disposed for revolving movements in paths parallel to the forward direction of travel of the harrow. When it is desired to open up the gang frames on the pivotal connection between the right hand ends of the frames, the cable 28 at the left hand side of the operators' seat on the tractor will be manipulated to rock the lever 27 controlling the latch device on the frame coupling at that side thereby lifting the dogs 22, as shown in dotted lines of Figure 2, out of engagement with the rack member 14 carried by the front or leading gang, so that the rack member is free to slide along the squared portion 19′ of the complemental U-bolt 19. With the release of these dogs 22, the tractor will be backed toward the leading gang frame, which backing movement is imparted to the draft frame, which swings rearwardly on the pivot connection 29″. The rearward movement of the draft frame is transmitted by the bar or rod 33 to the rear or trailing gang frame, which is swung in a rearward direction with the pivot 18 of the rack member at the right hand end of the same acting as its fulcrum. When thus fully opened, the two gang frames will assume the positions as shown in broken lines in Figure 1. The gang frames may now be locked in this angular opened position by releasing the left hand cable 28 to allow the springs 26 to reseat the dogs 22 into engagement with the teeth of the complemental rack member. In this angular position of adjustment, the disc blades of each gang frame will be reversed with respect to each other and positioned in said working relation, in which position the disks can follow turning movement of the tractor and harrow towards the right. Similarly, by manipulating the cable at the right hand side of the operator's seat, after the gangs have been returned to parallel position, the rack member at the right hand end of the rear or trailing gang frame can be opened up to reverse the angular disposition of the gang frames to facilitate a left hand turn of the tractor and harrow. When it is desired to bring the gang frames into normal parallel relation with respect to each other and from either of their angular positions of opening, by manipulating the proper cable to release the dogs 22, which are engaged with a rack at opened position, the forward movement of the tractor will exert a pull on the draft frame, and through the bar or lever 29 of the same, to the bar or rod 33. During this forward pulling action, the front gang frame will remain stationary, while the rear gang frame will be swung on a pivot 28, and into the desired parallel relation.

It is to be noted that the draft bars 30 and 31 are each provided with a series of spaced apertures which admit of the adjustment of the same, whereby they may be shortened or lengthened so as to vary the offsetting of the gang frame throughout a comparatively wide range, while the position of coupling of the tractor will be offset either to the right or left as may be desired or necessary.

By reversing the connection of the draft frame from the front side of the leading gang frame to the opposite end of the harrow, or to the rear side of the trailing gang frame for the operation of the harrow in the opposite direction, the direction of the throw of the loosened soil from the disc blades will be correspondingly reversed.

Without further description, it is thought that the features and advantages of the invention will be readily apparent to those skilled in the art, and it will of course be understood that changes in the form, proportion and minor details of construction may be resorted to, without departing from the spirit of the invention or its scope as claimed.

Having thus fully described the invention, what is claimed is:

1. In a machine of the class described, a leading gang frame, a trailing gang frame, extensible coupling means extending between both ends of said gang frames, and means for effecting longitudinal adjustment of said coupling means one independently of the other, to dispose said gang frames at various relative angular positions.

2. In a machine of the class described, a leading gang frame, a trailing gang frame, extensible coupling means between said gang frames and adjustable to dispose the gang frames to different relative positions, means for securing said coupling means in adjusted positions, means for releasing said securing means to allow for subsequent adjustments of said coupling means, a draft member pivoted at the forward side of said leading gang frame, and a connection extending between said draft member and said trailing gang frame, whereby a rearward movement of said draft member will separate said gang frames to angular positions one with respect to the other upon the release of said coupling securing means.

3. In a machine of the class described, a leading gang frame, a trailing gang frame, extensible coupling devices carried at the opposite adjacent ends of said gang frames and adjustable to dispose the gang frames to different relative positions, means for securing said coupling devices in adjusted positions, means for releasing the securing means of said coupling devices one independently of the other to allow for subsequent adjustments of the latter, a draft member pivoted to the forward side of said leading gang frame, and a connection extending between said draft member and said trailing gang frame, whereby a rearward movement of said draft member will separate said gang frames to angular positions one with respect to the other and correspondingly with the release of the securing means of either of said coupling devices.

4. In a machine of the class described, a leading gang frame, a trailing gang frame, extensible coupling devices carried at the opposite adjacent ends of said gang frames and adjustable to dispose the gang frames to different relative positions, means for securing said coupling devices in adjusted positions, means for releasing the securing means of said coupling devices one independently of the other to allow for subsequent adjustments of the latter, an adjustable draft member pivoted toward one end of and to the forward side of said leading gang frame, and a connection extending between said draft member and said training gang frame, whereby a rearward movement of said draft member will separate said gang frames to angular positions one with respect to the other and correspondingly with the release of the securing means of either of said coupling devices.

5. In a machine of the class described, front and rear gang frames, extensible couplings between both ends of the frames and having hinged connection therewith, and latch mechanism carried by each coupling for controlling the extension thereof.

6. In a machine of the class described, front and rear gang frames, extensible couplings between both ends of the frames and having hinged connection therewith, latch mechanism carried by each coupling for controlling the extension thereof, and draft actuated means for varying the length of either coupling upon release of the latch mechanism.

7. In a machine of the class described, front and rear draft frames, couplings between both ends of the frames and having hinged connection therewith each comprising a drawbar pivoted to one frame and slidably connected to the other, and latch mechanisms controlling the slidable connection of each drawbar to a frame.

JAMES S. STEWART.